(12) United States Patent
Landt

(10) Patent No.: US 6,600,443 B2
(45) Date of Patent: Jul. 29, 2003

(54) METHOD AND APPARATUS TO DETERMINE THE DIRECTION TO A TRANSPONDER IN A MODULATED BACKSCATTER COMMUNICATION SYSTEM

(75) Inventor: Jeremy A. Landt, Santa Fe, NM (US)

(73) Assignee: TC (Bermuda) License, Ltd., Hamilton (BM)

( * ) Notice: Subject to any disclaimer, the term of this patent is extended or adjusted under 35 U.S.C. 154(b) by 0 days.

(21) Appl. No.: 10/273,159

(22) Filed: Oct. 18, 2002

(65) Prior Publication Data

US 2003/0058155 A1 Mar. 27, 2003

Related U.S. Application Data

(63) Continuation of application No. 09/872,003, filed on Jun. 4, 2001, now Pat. No. 6,476,756.
(60) Provisional application No. 60/209,352, filed on Jun. 5, 2000.

(51) Int. Cl.$^7$ ............................................. G01S 13/82
(52) U.S. Cl. ........................... 342/42; 342/44; 342/147; 342/188; 340/825.36
(58) Field of Search ............................. 342/42, 44, 46, 342/47, 51, 147, 149, 152, 156, 188; 340/825.36

(56) References Cited

U.S. PATENT DOCUMENTS

| | | | |
|---|---|---|---|
| 4,565,996 A | 1/1986 | Close | 340/572 |
| 4,595,915 A | 6/1986 | Close | 340/572 |
| 4,728,955 A | 3/1988 | Hane | 342/140 |
| 4,739,328 A | 4/1988 | Koelle et al. | 342/44 |
| 5,510,795 A | 4/1996 | Koelle | 342/114 |
| 5,552,788 A | 9/1996 | Ryan et al. | 342/30 |
| 5,572,220 A | 11/1996 | Cai | 342/442 |
| 5,592,181 A | 1/1997 | Cai et al. | 342/457 |
| 5,648,767 A | 7/1997 | O'Connor et al. | 340/928 |
| 5,657,027 A | 8/1997 | Guymon, II | 342/445 |
| 5,675,342 A | 10/1997 | Sharpe | 342/42 |
| 5,701,127 A | 12/1997 | Sharpe | 342/42 |
| 5,710,566 A | 1/1998 | Grabow et al. | 342/457 |
| 5,751,227 A | 5/1998 | Yoshida et al. | 340/928 |
| 5,790,052 A | 8/1998 | Grabow | 340/928 |
| 5,952,922 A | 9/1999 | Shober | 340/572.4 |
| 6,046,683 A | 4/2000 | Pidwerbetsky et al. | 340/825.54 |
| 6,137,411 A | 10/2000 | Tyren | 340/572.1 |
| 6,169,519 B1 | 1/2001 | Holecek et al. | 342/442 |
| 6,184,841 B1 | 2/2001 | Shober et al. | 343/853 |
| 6,437,706 B2 | 8/2002 | Sato et al. | 340/928 |
| 6,476,756 B2 * | 11/2002 | Landt | 342/42 |
| 2002/0008656 A1 | 1/2002 | Landt | 342/42 |

OTHER PUBLICATIONS

Microwave Homodyne Systems (pp.: 206–215).
Introduction to Radar Systems (pp.: 174–185).

* cited by examiner

*Primary Examiner*—John B. Sotomayor
(74) *Attorney, Agent, or Firm*—Blank Rome LLP

(57) ABSTRACT

Methods and systems for determining the direction to a transponder are disclosed. The methods and systems include transmitting a first signal to an area where communications with a transponder is desired; producing a second signal desired from the first signal; receiving the second signal via a first and second antenna forming a difference signal from the second signal received via the first and second antennas; forming a third signal by adding the second signal received via the first antenna and the second signal received via the third antenna; delaying the difference signal; and comparing a fist polarity of the delayed difference signal with a second polarity of the third signal.

17 Claims, 3 Drawing Sheets

METHOD AND APPARATUS TO DETERMINE THE DIRECTION TO A TRANSPONDER IN A MODULATED BACKSCATTER COMMUNICATION SYSTEM

REFERENCE TO RELATED APPLICATION

This application is a continuation of Ser. No. 09/872,003, filed Jun. 4, 2001, now U.S. Pat. No. 6,476,756, and claims the benefit of U.S. Provisional Application No. 60/209,352, filed Jun. 5, 2000, whose disclosure is hereby incorporated by reference in its entirety into the present disclosure.

BACKGROUND OF THE INVENTION

1. Field of the Invention

The present invention relates to radio frequency identification (RFID) readers and transponders, and more particularly, to an RFID reader that can determine the direction of movement of a transponder relative to the reader in a modulated backscatter communication system.

2. Description of Related Art

In the automatic identification industry, the use of RFID transponders has grown in prominence as a way to track data regarding an object to which the RFID transponder is affixed. An RFID transponder generally includes a semiconductor memory in which digital information may be stored. A known technique for communicating with RFID transponders is referred to as "backscatter modulation," whereby the RFID transponders transmit stored data by modulating their antenna matching impedance to reflect varying amounts of an electromagnetic field generated by the RFID reader. An advantage of this communication technique is that the RFID transponders can operate independently of the frequency of the energizing electromagnetic field, and as a result, the reader may operate at multiple frequencies so as to avoid radio frequency (RF) interference, such as using frequency hopping spread spectrum modulation techniques. The RFID transponders may extract their power from the energizing electromagnetic field, thereby eliminating the need for a separate power source.

In many applications, it would be desirable for the RFID reader to derive location and direction information from the RFID transponder in addition to the stored data.

Typically, the determination of relative location between the RFID transponder and reader has been controlled by a combination of system sensitivity and antenna patterns. For example, an antenna of appropriate gain pattern can be used to provide coverage of a single lane of traffic so that an interrogator can establish communications with RFID transponders on vehicles in that lane and no other. This and similar techniques have been successfully used in systems where at most one object carrying a transponder can be physically located in the coverage area of the reader antenna. An ambiguity arises, however, when several transponders are located in the coverage area of the reader antenna. For such situations, it is necessary to physically determine which transponder has established communications with a reader, or alternatively, what the location of the transponder is with reference to the location and orientation of the reader.

There are many known techniques for determining the direction from a single location to a transponder using an array of antennas and measuring signal strength or arrival direction of the wave transmitted by the transponder. Hane (U.S. Pat. No. 4,728,955) describes one such technique to locate a modulated backscatter transponder using an antenna array. The transponder produces a single sideband suppressed carrier modulated backscatter signal that contains modulation of a subcarrier. The direction of arrival is determined by measuring the phase of the signal in each of several antennas and calculating the direction of arrival based on the measured phases. A significant drawback of this technique is that it is complex, cumbersome, and relies on carefully maintaining linearity in amplifiers and detectors. Moreover, the Hane technique includes measuring phase angles and using a computer to calculate the direction to the transponder, and is thus ill suited to receivers using limiting amplifiers, such as those shown by Koelle et.al. (U.S. Pat. No. 4,739,328).

Limiting amplifiers eliminate detailed phase information that would be necessary to accurately determine location using the Hane technique. The output of a limiting amplifier only provides information of whether the signal is from 0±90° from the reference phase (i.e., in phase) or is from 180±90° (i.e., out of phase) from the reference phase. All detailed phase information is therefore lost in a limiting amplifier.

More specifically, the Hane technique is ill suited for modulated backscatter systems that use direct modulation of the microwave carrier as opposed to the single sideband technique. That is because the output of the mixers in Hane will experience "quadrature nulls" with transponder position for transponders that do not produce a single sideband suppressed carrier signal. Koelle et. al. eliminate the "quadrature null" effect by using a multi-channel receiver and limiting amplifiers in the reader to communicate with the transponders. Thus, the Hane technique would not provide direction information for a transponder of the type disclosed by Koelle et al. even if the mixers of Hane are replaced with a multi-channel homodyne receiver of Koelle et al. in view of the use of limiting amplifiers.

An alternative direction finding system was disclosed by Koelle et. al. (U.S. Pat. No. 5,510,795). According to Koelle et. al., the direction finding system measures whether a transponder is moving toward or away from the reader. If the transponder is moving past a reader, the direction finding system will provide an indication of when the movement of the transponder is zero in the direction of the reader. Unless the path of the transponder is restricted (e.g., mounted on an object on rails), the system cannot be used to determine the direction to the transponder. Likewise, the system cannot be used to determine the direction to the transponder if the reader antenna is rotated in a searching mode since the distance between a transponder and the reader does not change in that case.

It is also possible to determine the location of a transponder using a bi-static homodyne radio system where the transmit antennas and receive antennas are separated by a considerable distance as compared to the microwave wavelength. Such a geometry is described in R. J. King, *Microwave Homodyne Systems*, pp. 206–216 (1978). Communication with transponders takes place where the gain patterns of the transmit and receive antenna of the reader system intersect. That intersection defines the area in space where communications with the transponder are possible. Such a system is not useful for a compact, handheld reader nor for determining the location of a particular transponder if several transponders are located in the communication zone.

Other direction finding techniques are used for determining the direction to a conventional radar target. A method known as "simultaneous lobing" or "monopulse" is described in M. I. Skolnik, *Introduction to Radar Systems*, pp. 175–184 (McGraw-Hill 1962). According to this method, collocated or closely spaced antennas forming sum and difference beams use phase and/or amplitude detectors to determine precisely when a radar beam is swept across a remote target. A drawback of this method is that it cannot be used to determine the direction to a backscatter transponder when it is in the vicinity of other scattering objects which produce signals stronger than those of the transponder. Additionally, typical antenna patterns of reader antennas are of relatively low gain (e.g., 6 to 15 dBi) because of the necessity of providing the required coverage area. If low gain antenna elements are used, the offset feed technique to produce two beams to form sum and difference beams results with a difference beam having very small gain, which is not useable for RFID applications. Thus, the normal direction finding techniques used in conventional radar systems are not applicable to modulated backscatter systems.

Accordingly, it would be desirable to determine the direction from a reader to a transponder in a backscatter communications system where the amplification of signals is performed using limiting amplifiers.

SUMMARY AND OBJECTS OF THE INVENTION

The present invention discloses methods and systems to determine the direction to a transponder in a modulated backscatter communication system. More particularly, such systems and methods make use of at least two antennas to receive a scattered or modulated signal from a transponder, such as a RF ID backscatter tag. An additional antenna is used as a reference from which the direction of the transponder is determined and is also used to transmit the signal to the transponder which then becomes modulated or scattered.

The signal received on the two antennas is used to form a difference signal. Since receiving the signal through the two antennas could have the effect of producing two different versions (i.e., different phases) of the signal, subtracting the outputs of the antennas will produce a difference signal that may not have a value of zero. That difference signal is delayed by 90 degrees. The polarity of the delayed signal is compared with the polarity of the scattered or modulated signal as received by the reference antenna to determine the direction of the transponder in relation to the reference antenna.

A first object of the present invention is to provide a simple yet accurate scheme for determining the direction of a transponder in relation to a reference antenna. Another object of the present invention is to provide a simple circuit for implementing the methods of the present invention. Still another object of the present invention is to enable the use of the disclosed systems and methods with backscatter tag receivers that use limiting amplifiers.

DETAILED DESCRIPTION OF THE PREFERRED EMBODIMENT

Figure 1:
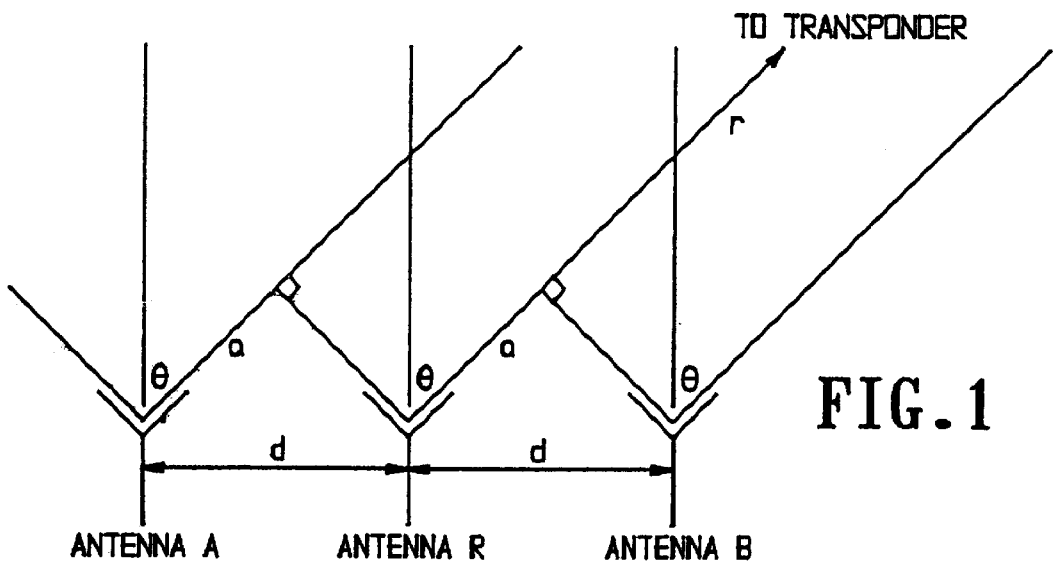
FIG. 1 is a diagram showing the geometry of a three antenna direction finding system in accordance with the present invention.

Referring now to the figures in which like reference numerals are used for like elements throughout, there is shown in FIG. 1, an antenna R transmits a signal to the area where communications with a transponder is desired. The signal is modulated and scattered by the transponder and is received by the antennas R, A and B. A first multichannel homodyne receiver can be connected to antenna R to provide the link for communications to and from the transponder (not shown). A microwave combiner (element 201 in FIG. 2) is used to provide a second channel by forming the difference signal between antennas A and B. The difference signal is delayed by 90° (i.e., ¼ wavelength).

A second multichannel homodyne receiver is attached to the second channel, and the polarity of the detected signal is compared to that of the first channel. If the polarities are the same, the transponder is to the left of the antenna R. Conversely, if the polarities are opposite, the transponder is to the right of the antenna R. If there is not signal detected in the second channel, the transponder is straight ahead. An indication of the transponder location can be provided by an indicator on the reader (not shown), which the system of the present invention is connected to, to enable the operator to locate the transponder with which communications have been established. With the aid of the indicator, the operator can locate the transponder in a fashion analogous to the pointing of a laser scanner to read bar codes. The first channel may also be formed using the sum of signals from the antennas A and B instead of the antenna R. Many other uses of the location information are possible.

More particularly, the operation of the invention in accordance with a first embodiment of the invention is analyzed below. As shown in FIG. 1, consider a transponder at a distance r from the three-element antenna array in the direction $\theta$. The spacing between the antennas is d. The distance r is assumed to be much greater than d, and the following analysis makes approximations based on that assumption. A signal is transmitted from the antenna R. The path length from the antenna R to the transponder and returning to the antenna R is 2r, which corresponds to a phase change of $4\pi r/\lambda$ radians where $\lambda$ is the microwave wavelength and $\pi$=3.14159265. The path length from the antenna R to the transponder and returning to the antenna B is shorter by the length a, wherein:

$$a = d \sin(\theta)$$

and the path length returning to the antenna A is longer by distance a. The phase change corresponding to the length a is $2\pi a/\lambda$. The time-varying nature of the signals, angular dependencies caused by the gains of the antennas at A, B, and R, the time variation of the modulation caused by the transponder and the variation in amplitude with the distance are represented by the function $f(r,t,\theta)$. That function need not be expanded to complete the analysis to determine the direction to the transponder. The signals received by the three antennas can then be expressed as:

$$V_R = f(r,t,\theta)\cos(4\pi r/\lambda)$$

$$V_A = f(r,t,\theta)\cos(4\pi r/\lambda) + 2\pi a/\lambda)$$

$$V_B = f(r,t,\theta)\cos(4\pi r/\lambda) - 2\pi a/\lambda)$$

The sum of the signals of the antennas A and B is:

$$V_{A+B} = f(r,t,\theta)\cos(4\pi r/\lambda + 2\pi a/\lambda) + f(r,t,\theta)\cos(4\pi r/\lambda - 2\pi a/\lambda)$$

$$= f(r,t,\theta)[\cos(4\pi r/\lambda)\cos(2\pi a/\lambda) - \sin(4\pi r/\lambda)\sin(2\pi a/\lambda) + \cos(4\pi r/\lambda)\cos(2\pi a/\lambda) + \sin(4\pi r/\lambda)\sin(2\pi a/\lambda)]$$

$$= 2f(r,t,\theta)\cos(4\pi r/\lambda)\cos(2\pi a/\lambda)$$

$$= 2f(r,t,\theta)\cos(4\pi r/\lambda)\cos(2\pi d \sin(\theta)/\lambda).$$

The difference between the signals of the antennas A and B is:

$$V_{A-B}=f(r,t,\theta)\cos(4\pi r/\lambda+\pi a/\lambda)-f(r,t,\theta)\cos(4\pi r/\lambda-2\pi a/\lambda)$$

$$=f(r,t,\theta)[\cos(4\pi r/\lambda)\cos(2\pi a/\lambda)-\sin(4\pi r/\lambda)\sin(2\pi a/\lambda)-\cos(4\pi r/\lambda)\cos(2\pi a/\lambda)-\sin(4\pi r/\lambda)\sin(2\pi a/\lambda)]$$

$$=-2f(r,t,\theta)\sin(4\pi r/\lambda)\sin(2\pi a/\lambda)$$

$$=-2f(r,t,\theta)\sin(4\pi r/\lambda)\sin(2\pi d\sin(\theta)/\lambda).$$

Add a delay of 90° ($\pi/2$) to the path length of signal $V_{A-B}$ to form signal $V_D$:

$$V_D=V_{A-B}\text{ (delayed by 90 degrees)}=V_{A-B}\text{ (with }4\pi r/\lambda\text{ replaced by }4\pi r/\lambda+\pi/2)=-2f(r,t,\theta)\sin(4\pi r/\lambda+\pi/2)\sin(2\pi d\sin(\theta)/\lambda)=-2f(r,t,\theta)\cos(4\pi r/\lambda)\sin(2\pi d\sin(\theta)/\lambda).$$

The terms $\cos(4\pi r/\lambda)$ and $\sin(4\pi r/\lambda)$ result from the normal changes in phase as the distance between the transponder and reader is varied. The signal of the sum channel is always in phase with the monostatic channel ($V_R$), but the antenna pattern is narrower due to the array effect. The signal of the difference channel which is delayed by 90° ($V_D$), is the same as the reference channel and the sum channel if the transponder is on the side of the array closer to the channel used as a positive reference, and is the inverse of the reference channel and sum channel if the transponder is on the side opposite to the channel used as positive reference for all values of r. When the transponder is straight ahead, the difference channel output is zero. Thus, an electronic circuit that compares the signals can indicate whether the transponder is to the right, to the left or straight ahead. An additional pair of antennas in the vertical plane can provide up/down indication as well, if desired. Comparison of the signals follows the demodulation of the microwave signals. Because of the quadrature null effect, both in phase and quadrature signals should be used.

Figure 2:
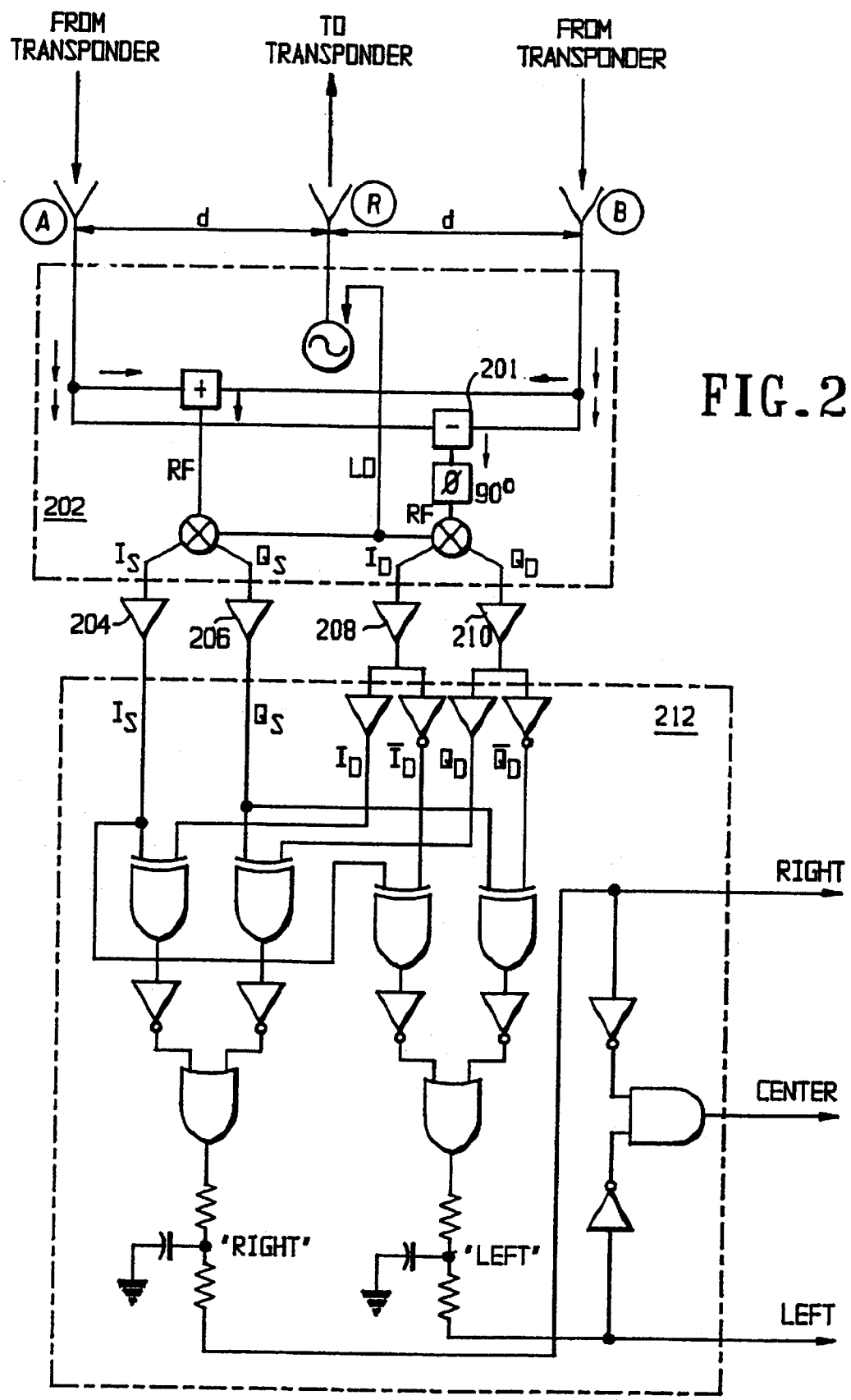
FIG. 2 is a schematic drawing of an exemplary direction finding system including a bi-static array of antennas.

An embodiment of the required circuitry is shown in FIG. 2. The sum and difference channels are formed from the microwave signals received by the antennas A and B. The circuitry to implement the indication of direction consists of homodyne receivers 202, providing in phase, I, and quadrature, Q, outputs that recover the modulation produced by the transponder in the normal fashion. Those signals are amplified by limiting amplifiers 204–210 that amplify the detected signals to logic levels. Those amplified I and Q signals of the difference channel are compared to the output from the reference channel (not shown in FIG. 2 for clarity) or the sum channel. Those comparisons are done with normal digital logic 212. Low pass filters (not shown) may be used to eliminate noise and transients caused at signal transitions and to provide an integration or smoothing effect for the outputs. The indication or direction does not require decoding of the signals, synchronization with the clock of the data, or any other such digital operation. Thus, the indication of direction can be implemented by using simple circuitry.

Figure 3:
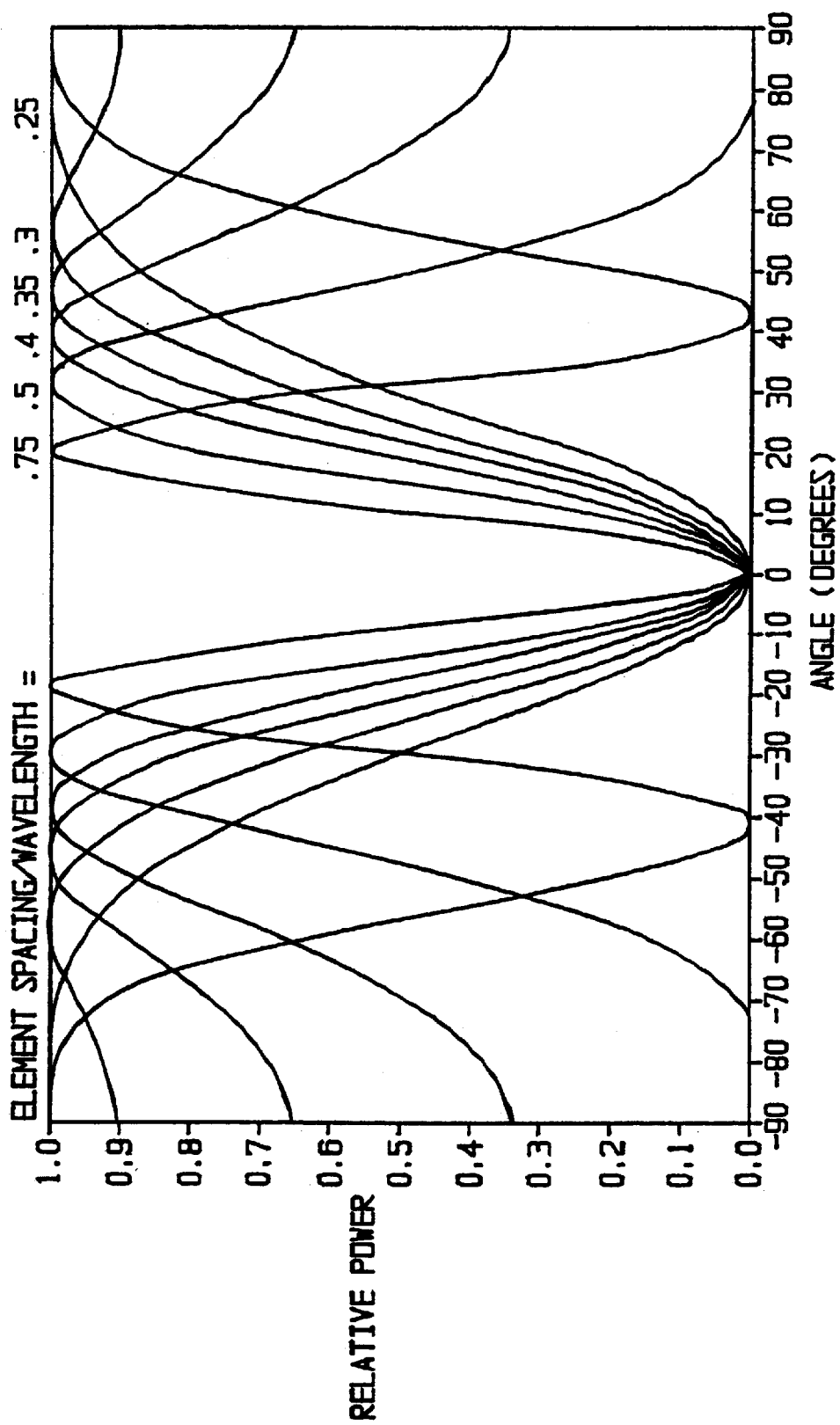
FIG. 3 is a graph illustrating the difference channel signal from the bi-static array of antennas.

The square of the term $\sin(2\pi d\sin(\theta)/\lambda)$ is plotted in FIG. 3 as a function of $\theta$ for various values of $d/\lambda$. The preferred value of $d/\lambda$ is approximately 0.5, although other antenna spacings can be used, depending on the desired physical width of the array and the width of the center null (which is used to provide 'transponder straight ahead' indication). Thus, an operator of a reader can localize the transponder with which he is communicating by repositioning the reader until an indication is provided that the desired transponder is straight ahead. Other uses of this information are also possible. Note that this technique functions with limiting amplifiers and no measurement of phase angles nor computation by computer is needed.

In alternative embodiments of the invention, additional detailed information regarding the direction to a transponder is provided instead of the general "right," "left" or "center" indications of FIG. 2. Four additional methods to provide the actual angle $\theta$ are presented below.

Figure 4:
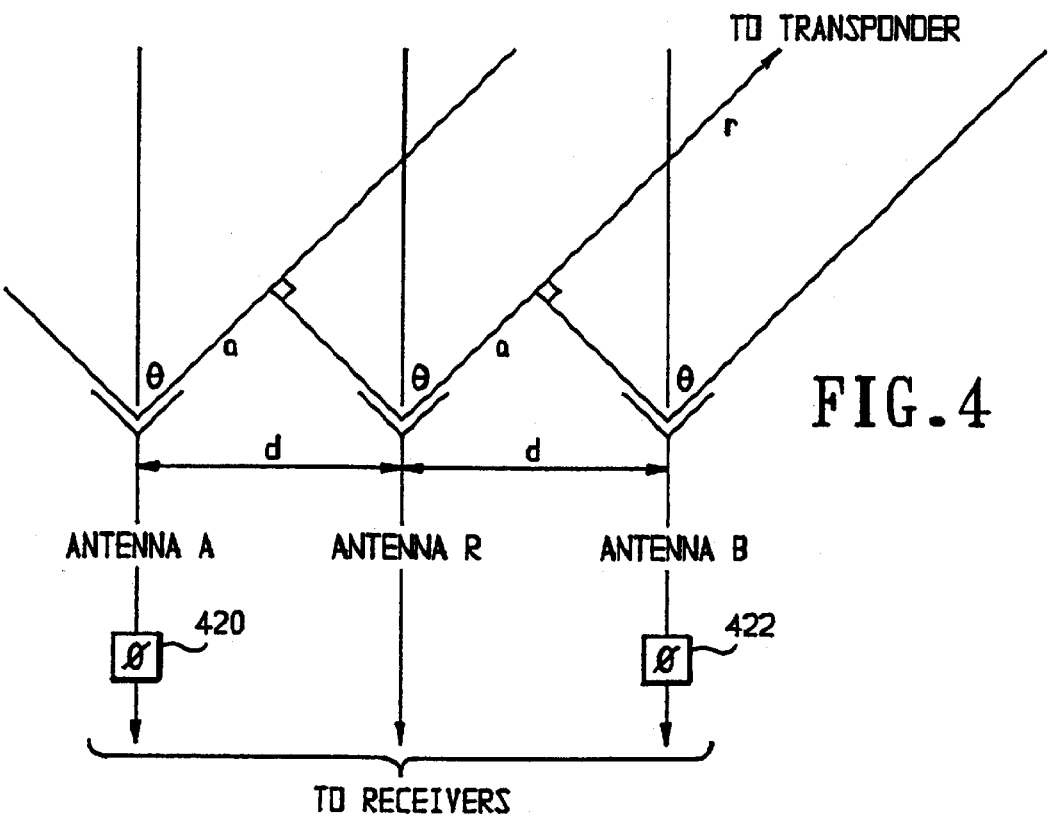
FIG. 4 is a diagram showing another embodiment of the geometry of a three antenna direction finding system in accordance with the present invention.

In a first alternative method, electronically controlled phase shifters 420 and 422 (FIG. 4) are added to the outputs of the antennas A and B. The amount of phase shift is controlled to be identical and of opposite polarity for the two channels. In that way, the "boresight" null is steered to the right or left by an amount controlled by the value of the inserted phase shift. The amount of steering can be calculated from the microwave wavelength $\lambda$, the antenna spacing d, and the amount of inserted phase shift. The amount of inserted phase can be swept, and when the processing circuitry of FIG. 2 indicates the transponder is at "center," the value of $\theta$ is directly related to the value of the inserted phase. The value of $\theta$ can be derived by computer, microcontroller or by discrete circuitry. Alternatively, a "pointing circuit" can be driven by the "left," "right" and "center" outputs of FIG. 2 to automatically adjust the inserted phase in a feedback loop to point toward the transponder. The direction to the transponder is found by the value of the inserted phase when the "pointing circuit" indicates that the transponder is at "center." A value of $\theta$ can be found from the value of the inserted phase as above. That value can be used as desired, or other visual display can be provided to the operator, such as LED display, LCD display, voice synthesis, or the like.

In a second alternative method, if two antennas are used to communicate with a transponder, the relative phase can be determined between each of the channels at the antenna outputs and a reference. The direction to the transponder can then be calculated knowing the difference in phase between these two channels, the antenna spacing and the microwave frequency. As shown in FIG. 1, a signal is transmitted to a transponder by the antenna R. The microwave signal from that antenna is also used as the reference signal for the quadrature homodyne receivers at the antennas A and B. The phase measured at antennas A and B have an ambiguity of an unknown phase caused by the length of the path to the transponder and back. Forming the mathematical difference in phase between the signals of the antennas A and B eliminates that unknown amount and the result is caused by the length 2a. The angle $\theta$ can be computed from the equation:

$$\theta=\arcsin(a/d)=\arcsin(\phi\lambda/2\pi d)$$

where $\phi=\phi_A-\phi_B$

The phases $\phi_A$ and $\phi_B$ are obtained by amplifying the outputs of the quadrature detector by a linear amplifier producing intermediate frequency (IF) or baseband signals, filtering those signals to isolate those due only to the modulation produced by the transponder, digitizing the results with analog-to-digital (A/D) converters, and computing the phase angles with a computer or microcontroller. An angle is calculated as the arctangent of the ratio of the quadrature signal to the in-phase signal (e.g., Vq/Vi) at the outputs of the quadrature homodyne detector.

The third alternative method relates to an alternative to the use of linear amplifiers, phase meters and computers would be to vary the phase between the reference channels and the signal channels in a controlled fashion, measure the locations of the quadrature nulls on each channel, and subsequent calculation or other indication of the angle of arrival of the signal from the transponder. The direction to the transponder can be found based on the differences in position of the quadrature nulls between the channels. This alternative method works with limiting amplifiers and eliminates phase meters, but with the added cost and complexity of requiring well controlled, low noise phase shifters.

An implementation of that method is to use a phase shifter that changes phase linearly with voltage. That phase-changed signal is used as the reference (or local oscillator (LO)) for the three quadrature homodyne receivers. As the voltage is ramped, the signals in the three channels are processed with a homodyne detector providing in phase and quadrature outputs. The detected signals are filtered by a bandpass filter and amplified by a limiting amplifier. The signals in the channels from the antennas A and B are each compared to the reference channel. If the transponder is straight ahead ($\theta=0$), then the signals in the three channels will always be of the same polarity, even though each channel changes polarity due to the quadrature null effect (as either r or the inserted phase varies). If the transponder is to the right ($\theta$ is positive), then there will be values of control voltage of the phase shifter for which the signals will be of the same polarity, and values for which the signals will be of the opposite polarity. The values of the inserted phase can be obtained by knowing the values of the control voltage. The differences in phase between the nulls is due to the phase corresponding to the distance 2a. Since d is known, a and thus $\theta$ can be found. A numerical value for $\theta$ can be calculated by the computer or microcontroller as described in the second alternative method.

The third method may use a technique for using the relative timings of the occurrences of quadrature nulls for determining direction that is analogous to using the timings of quadrature nulls for determining transponder motion as described in U.S. Pat. No. 5,510,795. As the phase of the LO reference signal is swept, quadrature null conditions are observed at the outputs of the three homodyne receivers at different times. Since the inserted phase on the LO signal corresponding to a 180 degree phase shift corresponds to the change in phase between quadrature null conditions on one channel, comparison of the timings of quadrature null conditions on the three channels provides a measurement of the relative phase between the channels. For example, if the phase of the LO signal is swept from 0 to 180 degrees, and the difference in timing between quadrature nulls between antennas A and B corresponds to ¼ of the sweep time, the phase difference between the signals received by antennas A and B is 45 degrees (180/4). Once the phase is known, the direction to the transponder is calculated by using the equation $$\theta = \arcsin(a/d) = \arcsin(\phi\lambda/2\pi d)$$

This method does not require linear amplifiers, A/D converters, or phase meters. The added complexity of a phase shifter over the foregoing methods provides an actual value of the angle $\theta$ in addition to the direction from the reader.

In a fourth alternative method of the present invention, the transmit-receive properties and equations are the same as in the foregoing methods, but with the elimination of the 90° phase shifter of FIG. 2. A homodyne receiver operates on the outputs of each of the three antennas and each produces an in phase (I) and (Q) demodulated signal. These demodulated signals are combined in various ways to produce the sum and difference signals that are used to provide an indication of the direction to the transponder. That method varies from the previous method in that the phases of the demodulated signals are not computed.

The foregoing methods can be used with antenna arrays of two or more elements to determine the direction to a cooperative radar target that is producing modulated backscatter. While the foregoing description used an array of three antennas, it should be appreciated that other combinations of two or more antennas can also be used. The use of limiting amplifiers is well known in the processing of signals in modulated backscatter communications systems. Prior to the invention disclosed herein, there was no known way to also determine the direction to the transponder using the output from limiting amplifiers operating on the outputs of homodyne quadrature detectors.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A method for determining the direction to an RF device comprising:
   receiving a first signal from the RF device via first, second, and third antennas;
   forming a difference signal from the first signal received via the first and second antennas;
   delaying the difference signal; and
   comparing a first polarity of the delayed difference signal with a second polarity of the first signal received via the third antenna.

2. The method of claim 1, further comprising:
   determining that the RF device is to the left of the third antenna when the first and second polarities are the same.

3. The method of claim 1, further comprising:
   determining that the RF device is to the right of the third antenna when the first and second polarities are opposite.

4. The method of claim 1, further comprising:
   determining that the RF device is aligned with the third antenna when the difference signal is not detected by a receiver.

5. The method of claim 1, wherein delaying the difference signal comprises:
   delaying the difference signal by 90 degrees.

6. The method of claim 1, further comprising:
   positioning the third antenna in between the first and second antennas so that the distance in between the third and first antennas is the same as in between the third and second antennas.

7. The method of claim 1, further comprising:
   connecting a first phase shifter to the output of the first antenna;
   connecting a second phase shifter to the output of the second antenna;
   setting a phase shift in the first and second phase shifters to have a same magnitude and an opposite polarity;
   varying the magnitude of the phase shift in the first and second phase shifters; and
   obtaining a value of the magnitude of the phase shift when the delayed difference signal is not detected by a receiver.

8. The method of claim 7, further comprising:
   determining that an angle to the RF device is the obtained value of the magnitude of the phase shift.

9. A method for determining the direction to an RF device comprising:

receiving a first signal from the RF device via first and second antennas;

forming a difference signal from the first signal received via the first and second antennas;

forming a second signal by adding the first signal received via the first antenna and the first signal received via the second antenna;

delaying the difference signal; and comparing a first polarity of the delayed difference signal with a second polarity of the second signal.

10. A method for determining the direction to an RF device comprising:

receiving a first signal from the RF device via first and second antennas;

forming a difference signal from the first signal received via the first and second antennas;

connecting a first phase shifter to the output of the first antenna;

connecting a second phase shifter to the output of the second antenna;

setting a phase shift in the first and second phase shifters to have the same magnitude and opposite polarity;

varying the magnitude of the phase shift in the first and second phase shifters; and obtaining a value of the magnitude of the phase shift when the difference signal is not detected by a receiver.

11. The method of claim 10, further comprising:

determining that an angle to the RF device is the obtained value of the magnitude of the phase shift.

12. A method for determining the direction to an RF device comprising:

receiving a first signal from the RF device via first and second antennas;

obtaining a difference of phases at the first and second antennas; and determining an angle θ to the RF device by using the equation $$\theta = \arcsin(\Phi \lambda / 2\pi d);$$

wherein

Φ is the obtained phase difference, λ is the wave length of the first signal, and d is the distance in between the first and second antenna.

13. The method of claim 12, wherein the step of obtaining the difference in phases comprises:

performing a first quadrature detection of the first signal received via the first antenna;

performing a second quadrature detection of the first signal received via the second antenna;

linearly amplifying the first and second detected signals;

filtering the first and second amplified signals to isolate a modulation produced by the RF device;

digitizing the first and second filtered signals;

computing a first phase by calculating the arctangent of the ratio of a quadrature signal component of the first digitized signal to in-phase signal component of the first digitized signal;

computing a second phase by calculating the arctangent of the ratio of a quadrature signal component of the second digitized signal to the in-phase signal component of the second digitized signal; and subtracting the second phase from the first phase.

14. The method of claim 12, wherein the step of obtaining the difference in phases comprises:

performing a first quadrature detection by mixing the first signal received via the first antenna with an LO reference signal;

performing a second quadrature detection by mixing the first signal received via the second antenna with the LO reference signal;

varying the LO reference signal over a phase range during a sweep time;

measuring a difference in timing between quadrature nulls corresponding to the first and second antennas;

forming a ratio of said difference in timing to said sweep time; and multiplying said ratio by said phase range.

15. The method of claim 9, further comprising:

determining that the RF device is to the left of a third antenna located in between and aligned with the first and second antennas when the first and second polarities are the same.

16. The method of claim 9, further comprising:

determining that the RF device is to the right of a third antenna located in between and aligned with the first and second antennas when the first and second polarities are opposite.

17. The method of claim 9, further comprising:

determining that the transponder is aligned with a third antenna located in between and aligned with the fist and second antennas when the difference signal is not detected by a receiver.

* * * * *